(12) United States Patent
Wang et al.

(10) Patent No.: US 12,174,444 B2
(45) Date of Patent: Dec. 24, 2024

(54) OPTICAL ELEMENT DRIVING MECHANISM

(71) Applicant: TDK TAIWAN CORP., Taoyuan (TW)

(72) Inventors: Chao-Hsi Wang, Taoyuan (TW);
Chao-Chang Hu, Taoyuan (TW);
Chih-Wei Weng, Taoyuan (TW);
He-Ling Chang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 136 days.

(21) Appl. No.: 17/939,739

(22) Filed: Sep. 7, 2022

(65) Prior Publication Data

US 2022/0413248 A1    Dec. 29, 2022

Related U.S. Application Data

(63) Continuation of application No. 16/898,777, filed on Jun. 11, 2020, now Pat. No. 11,467,364.

(Continued)

(30) Foreign Application Priority Data

Feb. 3, 2020    (CN) .......................... 202020150608.3

(51) Int. Cl.
*G02B 7/00*    (2021.01)
*G02B 7/02*    (2021.01)
(Continued)

(52) U.S. Cl.
CPC ............. *G02B 7/005* (2013.01); *G02B 7/022* (2013.01); *G02B 7/04* (2013.01); *G02B 27/646* (2013.01); *G03B 3/10* (2013.01); *G03B 5/00* (2013.01); *G03B 13/36* (2013.01); *H02N 2/103* (2013.01); *H02N 2/142* (2013.01); *H04N 23/60* (2023.01);
(Continued)

(58) Field of Classification Search
CPC ... G03B 9/06; G03B 9/08; G03B 9/18; G03B 9/36; G03B 9/40
See application file for complete search history.

(56) References Cited

U.S. PATENT DOCUMENTS 3,829,877 A    8/1974 Kitai
2011/0122311 A1    5/2011 Han
(Continued)

*Primary Examiner* — Noam Reisner
(74) *Attorney, Agent, or Firm* — MUNCY; GEISSLER, OLDS & LOWE, P.C.

(57) ABSTRACT

An optical element driving mechanism is provided. The optical element driving mechanism includes a fixed portion, a movable portion, a first driving assembly, and a positioning element. The movable portion is movably disposed on the fixed portion and comprising an optical element. The optical element moves in a first direction. The first driving assembly is at least partially disposed on the fixed portion. The positioning element is rotatably disposed on the fixed portion or the movable portion. When the first driving assembly is not activated, the positioning element is used to limit the position of the movable portion relative to the fixed portion to a limit position, and the positioning element comprises a main body and a limiting portion extending from the main body in a second direction that is perpendicular to the first direction. The limiting portion passes through the optical element.

18 Claims, 19 Drawing Sheets

Related U.S. Application Data

(60) Provisional application No. 62/899,423, filed on Sep. 12, 2019.

(51) Int. Cl.
    *G02B 7/04*         (2021.01)
    *G02B 27/64*      (2006.01)
    *G03B 3/10*         (2021.01)
    *G03B 5/00*         (2021.01)
    *G03B 13/36*      (2021.01)
    *H02N 2/10*         (2006.01)
    *H02N 2/14*         (2006.01)
    *H04N 23/60*      (2023.01)

(52) U.S. Cl.
    CPC ............... *G03B 2205/0007* (2013.01); *G03B 2205/0061* (2013.01)

(56) References Cited

U.S. PATENT DOCUMENTS

2012/0020657 A1    1/2012   Murakami et al.
2012/0076486 A1*  3/2012   Bai .......................... G03B 9/06
                                                    396/463

* cited by examiner

OPTICAL ELEMENT DRIVING MECHANISM

CROSS REFERENCE TO RELATED APPLICATIONS

This application is a Continuation Application of U.S. patent application Ser. No. 16/898,777, filed on Jun. 11, 2020, which claims the benefit of U.S. Provisional Application No. 62/899,423, filed on Sep. 12, 2019 and China Patent Application No. 202020150608.3, filed on Feb. 3, 2020, the entirety of which are incorporated by reference herein.

BACKGROUND OF THE DISCLOSURE

Field of the Disclosure

The present disclosure relates to an optical element driving mechanism.

Description of the Related Art

As technology has developed, it has become more common to include image-capturing and video-recording functions into many types of modem electronic devices, such as smartphones and digital cameras. These electronic devices are used more and more often, and new models have been developed that are convenient, thin, and lightweight, offering more choices for consumers.

BRIEF SUMMARY OF DISCLOSURE

An optical element driving mechanism is provided. The optical element driving mechanism includes a fixed portion, a movable portion, a first driving assembly, and a positioning element. The movable portion is movably disposed on the fixed portion and includes an optical element, wherein the optical element moves in a first direction. The first driving assembly is at least partially disposed on the fixed portion. The positioning element is rotatably disposed on the fixed portion or the movable portion, wherein when the first driving assembly is not activated, the positioning element is used to limit the position of the movable portion relative to the fixed portion to a limit position.

In some embodiments, the optical element driving mechanism further includes a second driving assembly separated from the first driving assembly for a distance. In some embodiments, the first driving assembly, the second driving assembly, and the positioning element are arranged in the first direction. In some embodiments, the first driving assembly includes a first magnetic element and a second magnetic element arranged in a second direction that is perpendicular to the first direction.

In some embodiments, the fixed portion includes a case and a base, the base is disposed on the base, and the case includes a connecting portion in direct contact with the base. In some embodiments, the connecting portion is positioned between the first driving assembly and the positioning element when viewed in a third direction that is perpendicular to the first direction. In some embodiments, the optical element driving mechanism further includes a second driving assembly, wherein the second driving assembly and the connecting portion at least partially overlap when viewed in the third direction.

In some embodiments, the positioning element includes a main body and a stopping portion extending from the main body. In some embodiments, the optical element driving mechanism further includes a limiting element disposed between the positioning element and the fixed portion. In some embodiments, the fixed portion includes a case and a base, the case is disposed on the base, and the limiting element is disposed between the case and the positioning element. In some embodiments, the optical element driving mechanism further includes an electronic element disposed on the fixed portion, and the first driving assembly is disposed between the electronic element and the positioning element.

In some embodiments, the fixed portion has an opening for accommodating an optical module. In some embodiments, the opening at least partially overlaps the optical module in the second direction. In some embodiments, the optical element driving mechanism further includes a circuit electrically connected to the first driving assembly, wherein the fixed portion has a recess, and the circuit is disposed in the recess. In some embodiments, the first driving assembly is positioned between the recess and the positioning element.

In some embodiments, the optical element driving mechanism further includes a holder affixed to the optical element and disposed between the optical element and the first driving assembly. In some embodiments, the first driving assembly includes a first magnetic element, the holder has a recess, and the first magnetic element is disposed in the recess. In some embodiments, the holder has an opening, and the first magnetic element is exposed from the opening when viewed in the second direction. In some embodiments, the positioning element further includes a main body and two limiting portions extending from the main body in the first direction. The two limiting portions pass through the optical element. In some embodiments, the optical element has a passage, each of the limiting portions has a column-like shape, and the width of the passage is greater than the diameter of each of the limiting portions.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF DISCLOSURE

Figure 1:
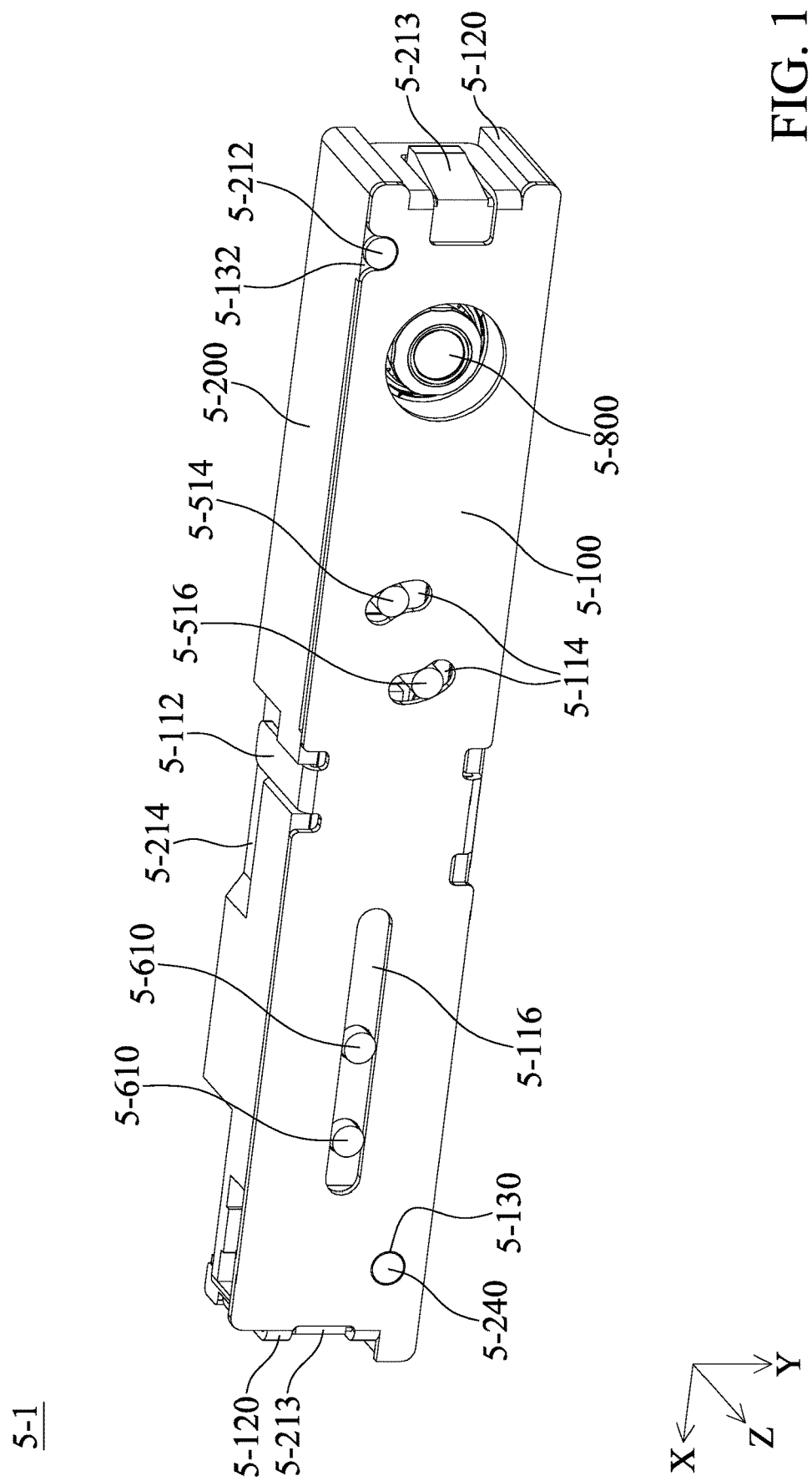
FIG. 1 is a schematic view of an optical element driving mechanism according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Figure 2:
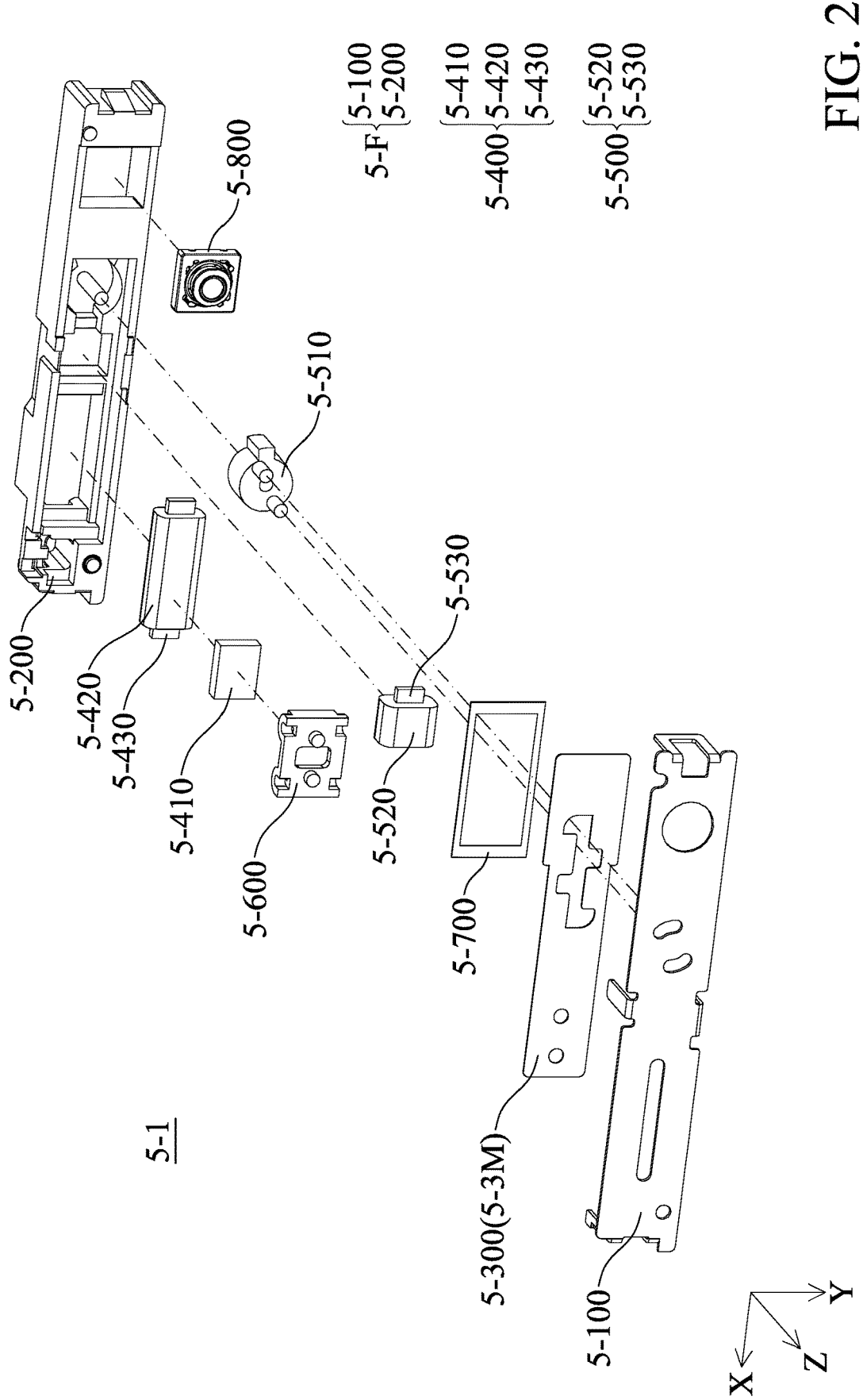
FIG. 2 is an exploded view of the optical element driving mechanism.
Figure 3:
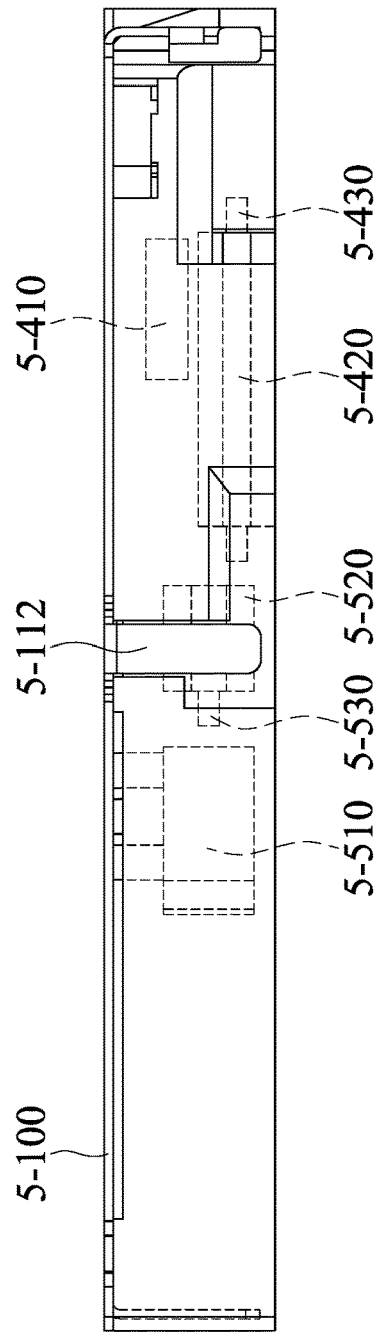
FIG. 3 is a side view of the optical element driving mechanism.

Refer to FIG. 1 to FIG. 3. FIG. 1 is a schematic view of an optical element driving mechanism 5-1 according to some embodiments of the present disclosure, FIG. 2 is an exploded view of the optical element driving mechanism 5-2, and FIG. 3 is a side view of the optical element driving mechanism 5-1. The optical element driving mechanism 5-1 mainly includes case 5-100, a base 5-200, an optical element 5-300, a first driving assembly 5-400 (which includes a first magnetic element 5-410, a second magnetic element 5-420, and a third magnetic element 5-430), a second driving assembly 5-500 (which includes a fourth magnetic element 5-520 and a fifth magnetic element 5-530), a positioning element 5-510, a holder 5-600, and a limiting element 5-700. An optical module 5-800 may be disposed in the optical element driving mechanism 5-1. The optical module 5-800 may be a voice coil motor (VCM) having an optical unit (such as a lens, a mirror, a prism, a beam splitter, or an aperture), or it may be the optical unit itself.

In some embodiments, the case 5-100 and the base 5-200 may be combined as an outer case of the optical element driving mechanism 5-1. Furthermore, the case 5-100 and the base 5-200 may be referred to as a fixed portion 5-F.

The optical element 5-300 may be moved in the X direction (the first direction) to act as a shutter of the optical module 5-800 or to block the optical module 5-800 when not using the optical module 5-800 (to be described later) to increase security. In some embodiments, the optical element 5-300 may be referred to as a movable portion 5-M and is movably disposed on the fixed portion 5-F.

Figure 4:
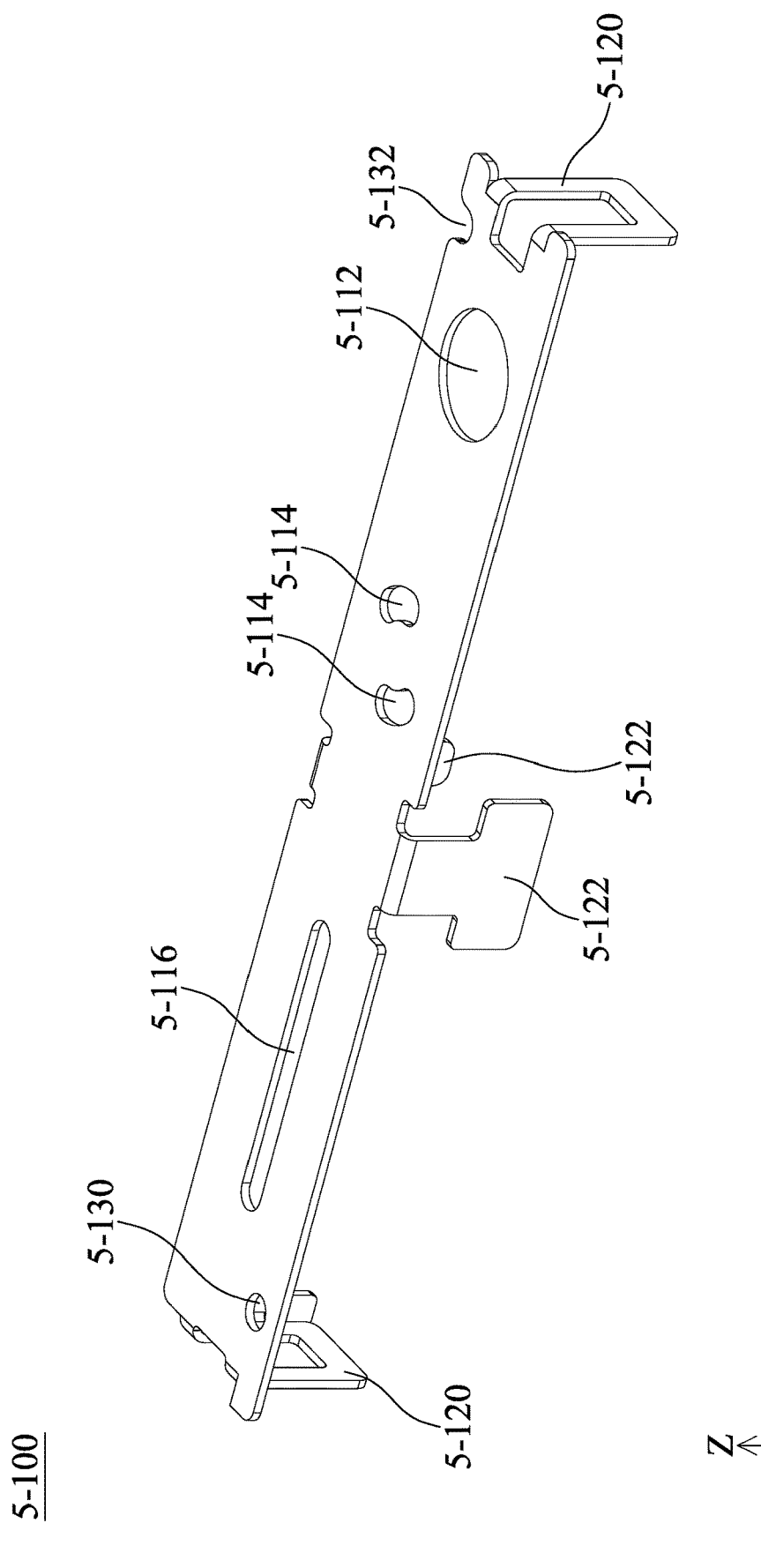
FIG. 4 is a schematic view of the case.

FIG. 4 is a schematic view of the case 5-100. The case 5-100 may include an optical opening 5-112, a pair of connecting openings 5-114, a passage 5-116, connecting portions 5-120 positioned on short sides of the case 5-100, connecting portions 5-122 positioned on long sides of the case 5-100, a positioning opening 5-130, and a positioning recess 5-132.

As shown in FIG. 1 and FIG. 4, the optical opening 5-112 allows the optical module 5-800 to be exposed, so that the optical module 5-800 may capture images from outside. The connecting opening 5-114 may allow the limiting portions 5-514 and 5-516 of the positioning element 5-510 to rotate, and the passage 5-116 allows the positioning element 5-610 of the holder 5-600 to move in the passage 5-116 (to be described later).

Figure 5:
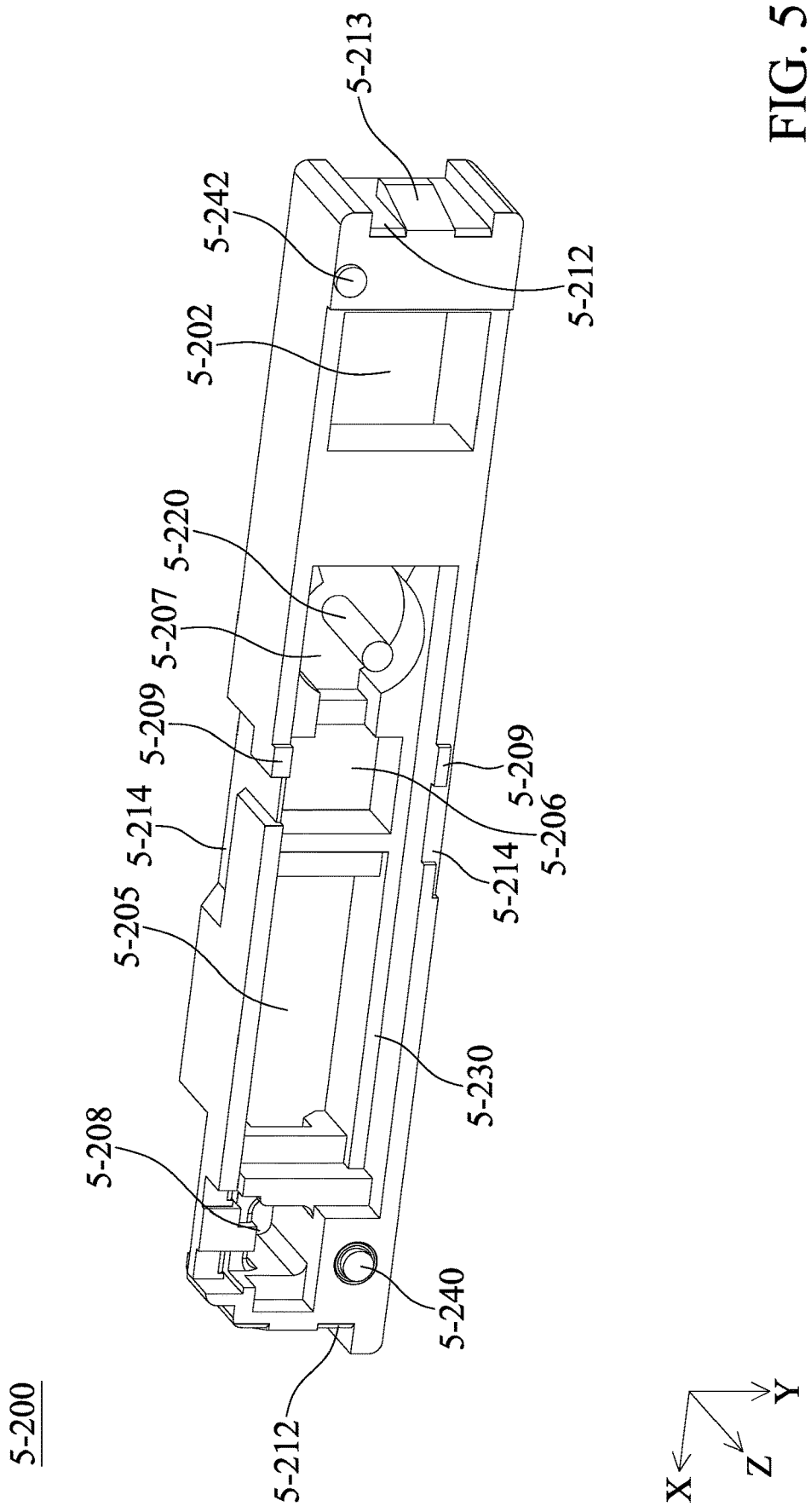
FIG. 5 and FIG. 6 are schematic views of the base when viewed in different directions.
Figure 6:
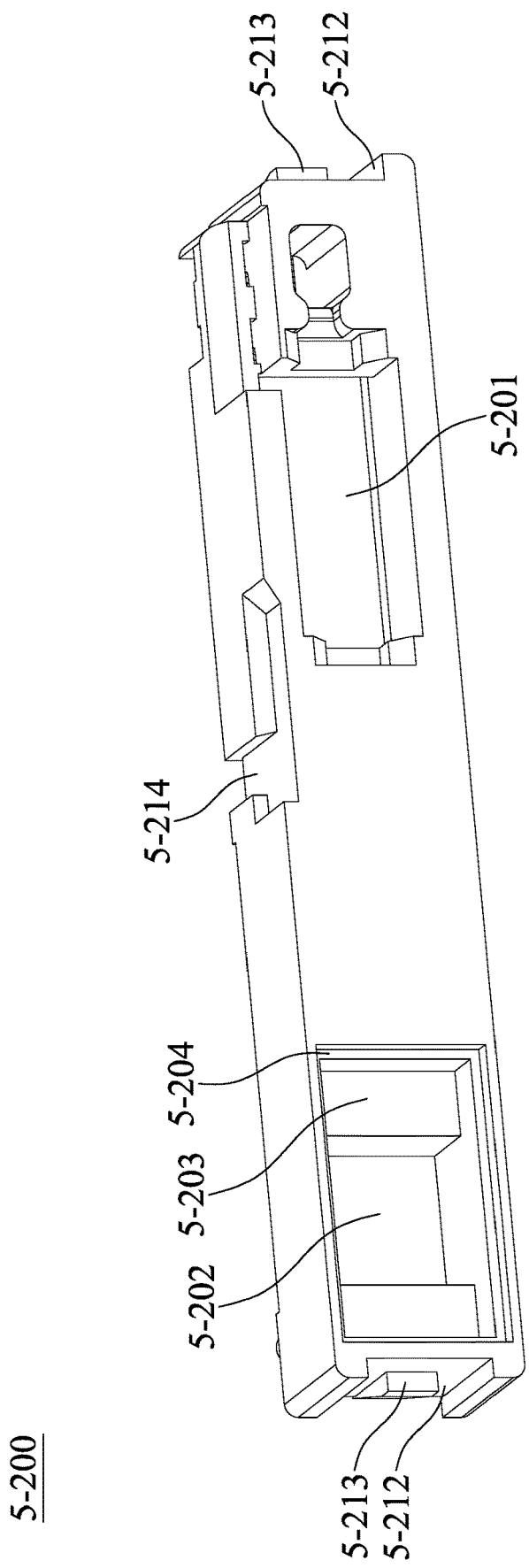

FIG. 5 and FIG. 6 are schematic views of the base 5-200 when viewed in different directions. The base 5-200 may include a recess 5-201 and a concave portion 5-203 positioned at one side of the base 5-200, an opening 5-202 in the concave portion 5-203, a recess at the side of the concave portion 5-203, and recesses 5-205, 5-206, 5-207, and 5-208 positioned at another side of the base 5-200, a protruding portion 5-209 positioned at a side of the base 5-200, concave portions 5-212 positioned at opposite sides of two short sides of the base 5-200, protruding portions 5-213 in the concave portions 5-212, concave portions 5-214 positioned at long sides of the base 5-200, a column 5-220 in the recess 5-207, contact portions 5-230 on opposite sides of the recess 5-205, a first positioning portion, and a second positioning portion 5-242.

As shown in FIG. 1, the first positioning portion 5-240 and the second positioning portion 5-242 of the base 5-200 may be positioned in the positioning opening 5-130 and the positioning recess 5-132 of the case 5-100, respectively, to define the position of the case 5-100 relative to the base 5-200. The elements (such as the case 5-100 or the base 5-200) may have a manufacturing tolerance, and the positioning recess 5-132 may allow the elements to be assembled to each other even if tolerance occurs in these elements.

In some embodiments, the optical module 50800 may be disposed at the opening 5-202 and the concave portion 5-203 of the base 5-200, and the light incident side of the optical module 5-800 may be exposed from the opening 5-202. In other words, as shown in FIG. 1, the opening 5-20 and the optical module 5-800 at least partially overlap each other when viewed in the Z direction (the second direction) to allow light to pass through the opening 5-202 to reach the optical module 5-800. In some embodiments, the optical module 5-800 may be affixed to the base 5-200 with glue, and the recess 5-204 may store excess glue to prevent the glue from coming onto contact with other elements.

In some embodiments, an electronic element (not shown) may be disposed in the recess 5-201 of the base 5-200, such as a chip, and the first driving assembly 5-400 may be positioned between the electronic element and the positioning element 5-510. The electronic element may control the operation of the optical element driving mechanism 5-1. Furthermore, a circuit (not shown) may be disposed in the recess 5-208 and electrically connected to the first driving assembly 5-400 to provide electrical signal to the driving assembly 5-400. The first driving assembly 5-400 is positioned between the recess 5-208 and the positioning element 5-510.

The connecting portion 5-120 of the case 5-100 may be positioned in the concave portion 5-212 of the base 5-200 at the short sides of the optical element driving mechanism 5-1, and the protruding portion 5-213 may be exposed from the connecting portion 5-120. As a result, the case 5-100 and the base 5-200 may be engaged with each other. Furthermore, the connecting portion 5-122 of the case 5-100 may be positioned in the concave portion 5-214 of the base 5-200 at the long sides of the optical element driving mechanism 5-1, to allow the connecting portion 5-122 to be in direct contact with the base 5-200, which further defines the position of the case 5-100 and the base 5-200. Moreover, as shown in FIG. 3, the connecting portion 5-122 may be positioned between the first driving assembly 5-400 and the positioning element 5-510, and the second driving assembly 5-500 and the connecting portion 5-122 may be at least partially overlap each other when viewed in a third direction (Y direction) to achieve miniaturization.

Figure 7:
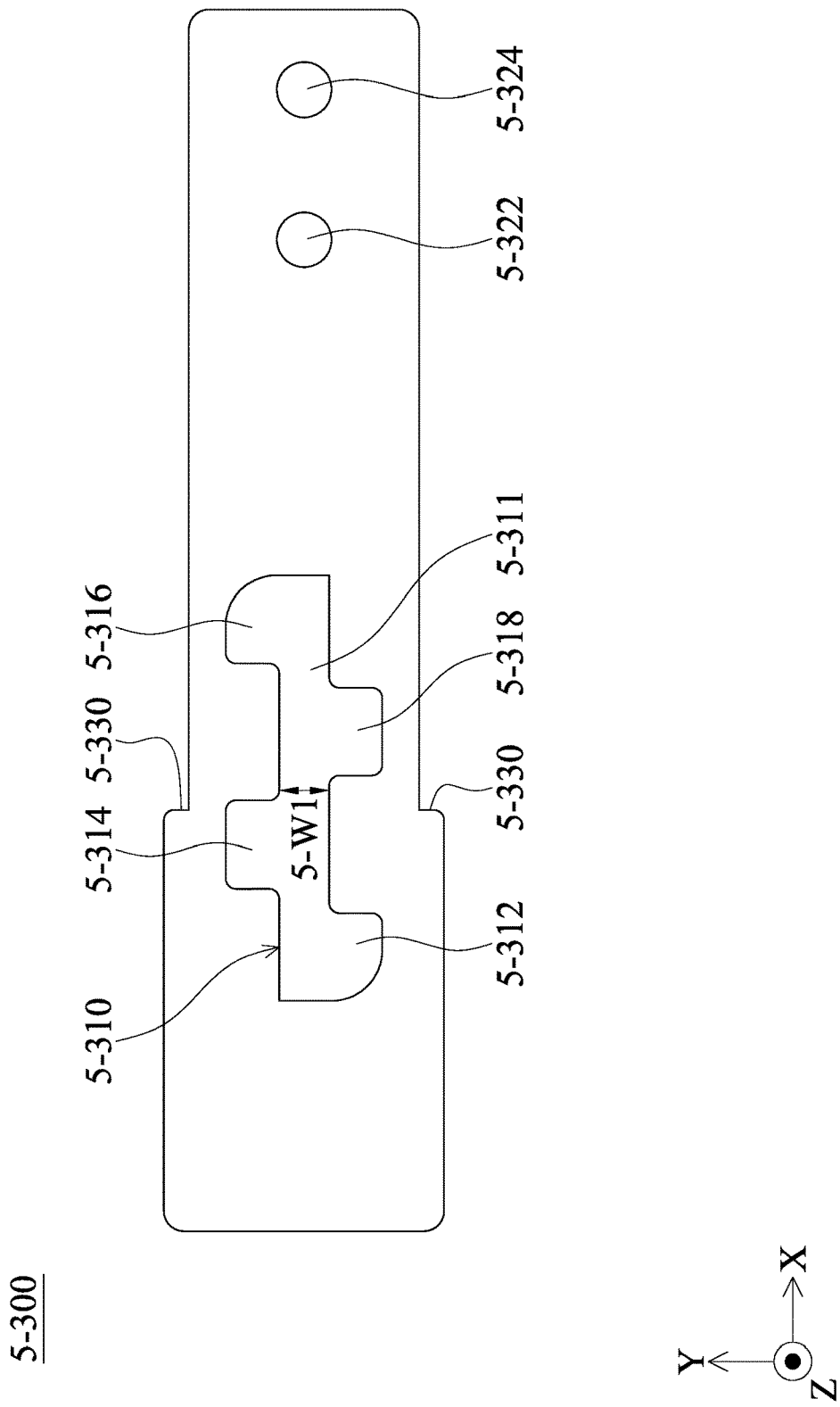
FIG. 7 is a top view of the optical element.

FIG. 7 is a top view of the optical element 5-300. In some embodiments, the optical element 5-300 may be plate-shaped. An opening 5-310 may be formed on the optical element 5-300, the opening 5-310 has notches 5-312, 5-314, 5-316, 5-318 and a passage connecting the notches 5-312, 5-314, 5-316, 5-318. Moreover, the optical element 5-300 has openings 5-322 and 5-324. Stopping portions 5-300 are formed at sides of the optical element 5-300. In some embodiments, the width of the passage 5-311 is 5-W in the Y direction.

Figure 8:
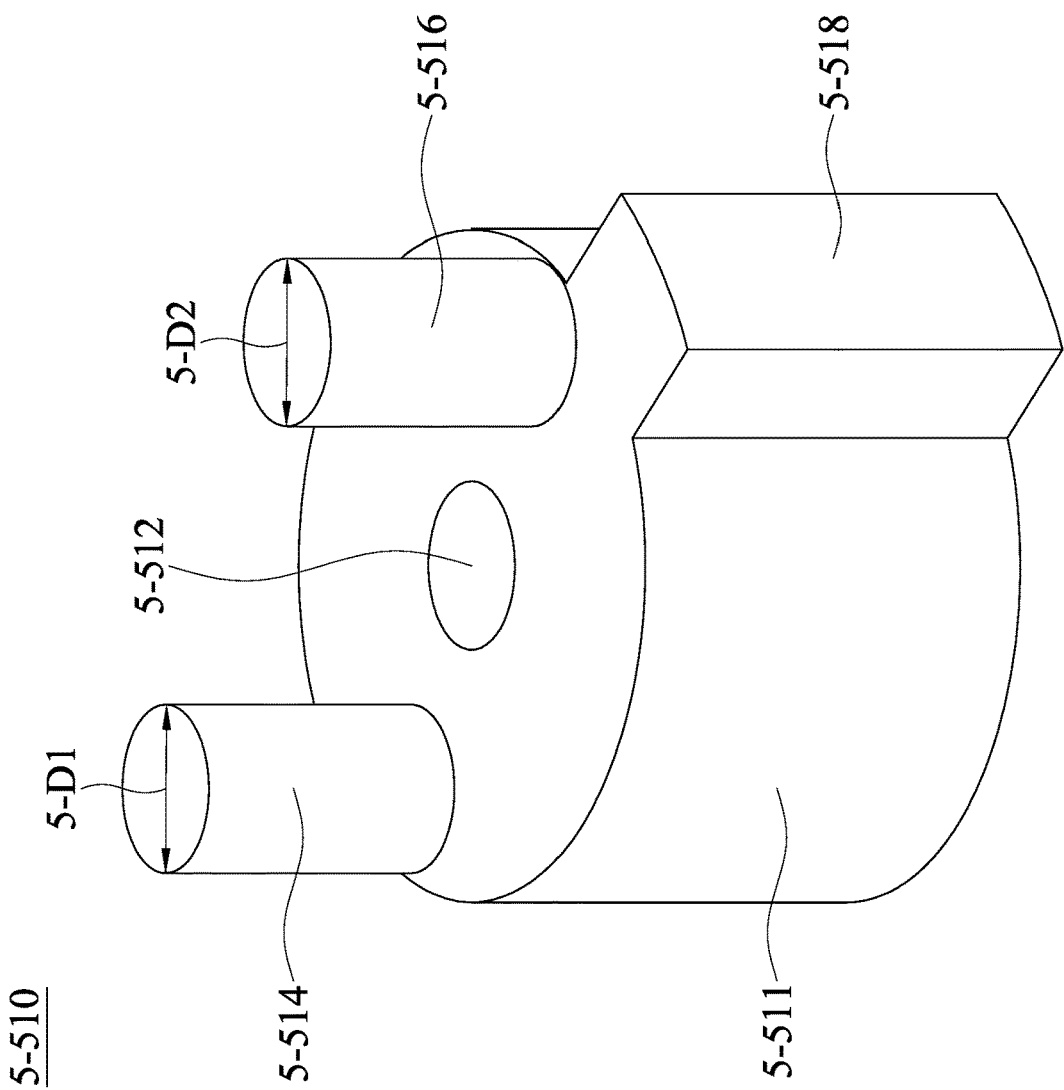
FIG. 8 is a schematic view of the positioning element.

FIG. 8 is a schematic view of the positioning element 5-510. The positioning element 5-510 may include a column-like shaped main body 5-511. The main body 5-511 has a hole 5-512 running through the main body 5-511, and limiting portions 5-514 and 5-516 extending in the Z direction (second direction). Furthermore, a stopping portion 5-518 may be formed at the side of the main body 5-511 and extending from the main body 5-511 in the X direction (the first direction). In some embodiments, the limiting portions 5-514 and 5-516 may be column-like shaped, and the diameters of the limiting portions 5-514 and 5-516 may be 5-D1 and 5-D2, respectively. In some embodiments, diameter 5-D1 may be substantially identical to diameter 5-D2.

Figure 9:
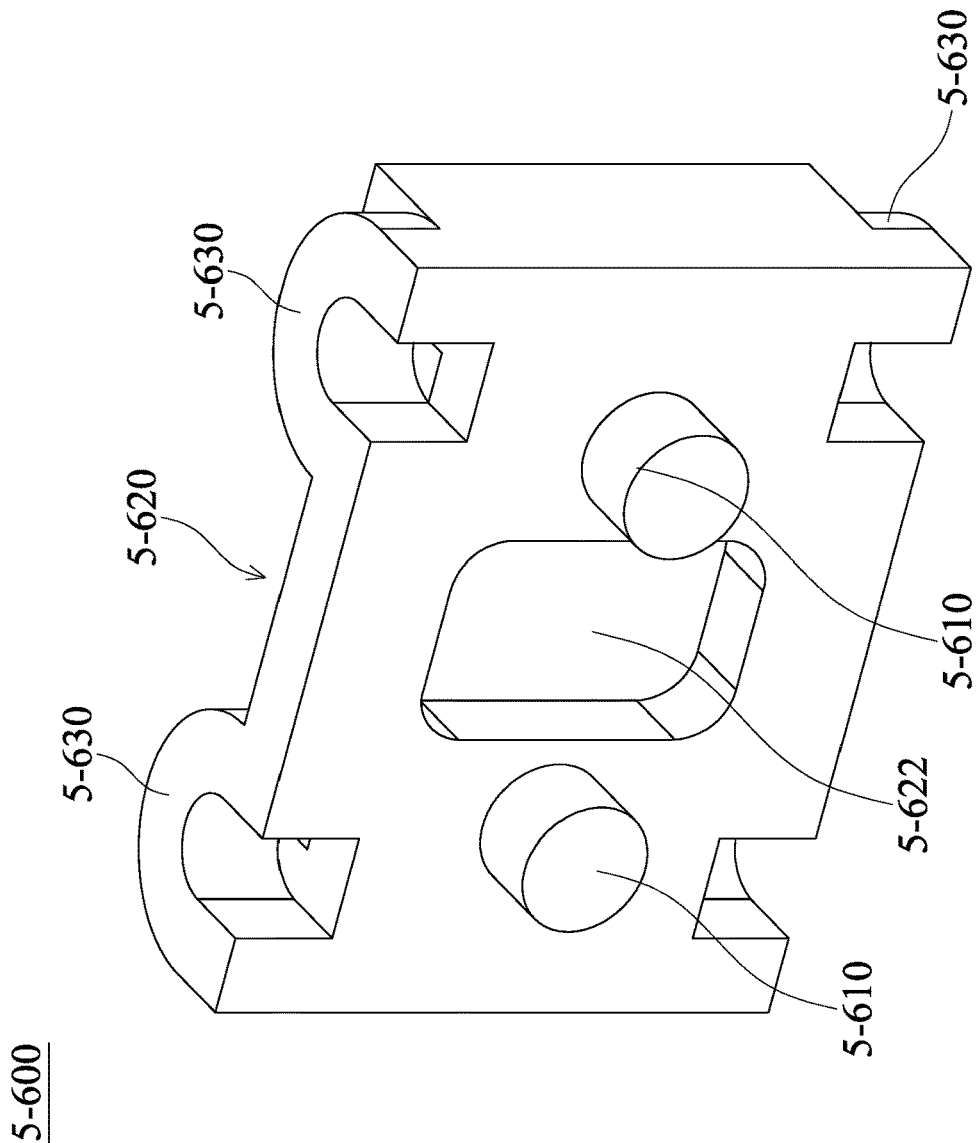
FIG. 9 is a schematic view of the holder.

FIG. 9 is a schematic view of the holder 5-600. The holder 5-600 may include a main body 5-605, two positioning elements 5-610 on one side of the main body 5-605, a recess 5-620 on another side of the main body 5-605, and an opening 5-622 on the main body 5-605. Furthermore, in some embodiments, a plurality of contact portions 5-630 may be formed on the side of the main body 5-605, wherein the sides of the contact portions 5-630 may be arc-shaped to reduce friction between the contact portions 5-630 and other elements (such as the base 5-200).

Figure 10:
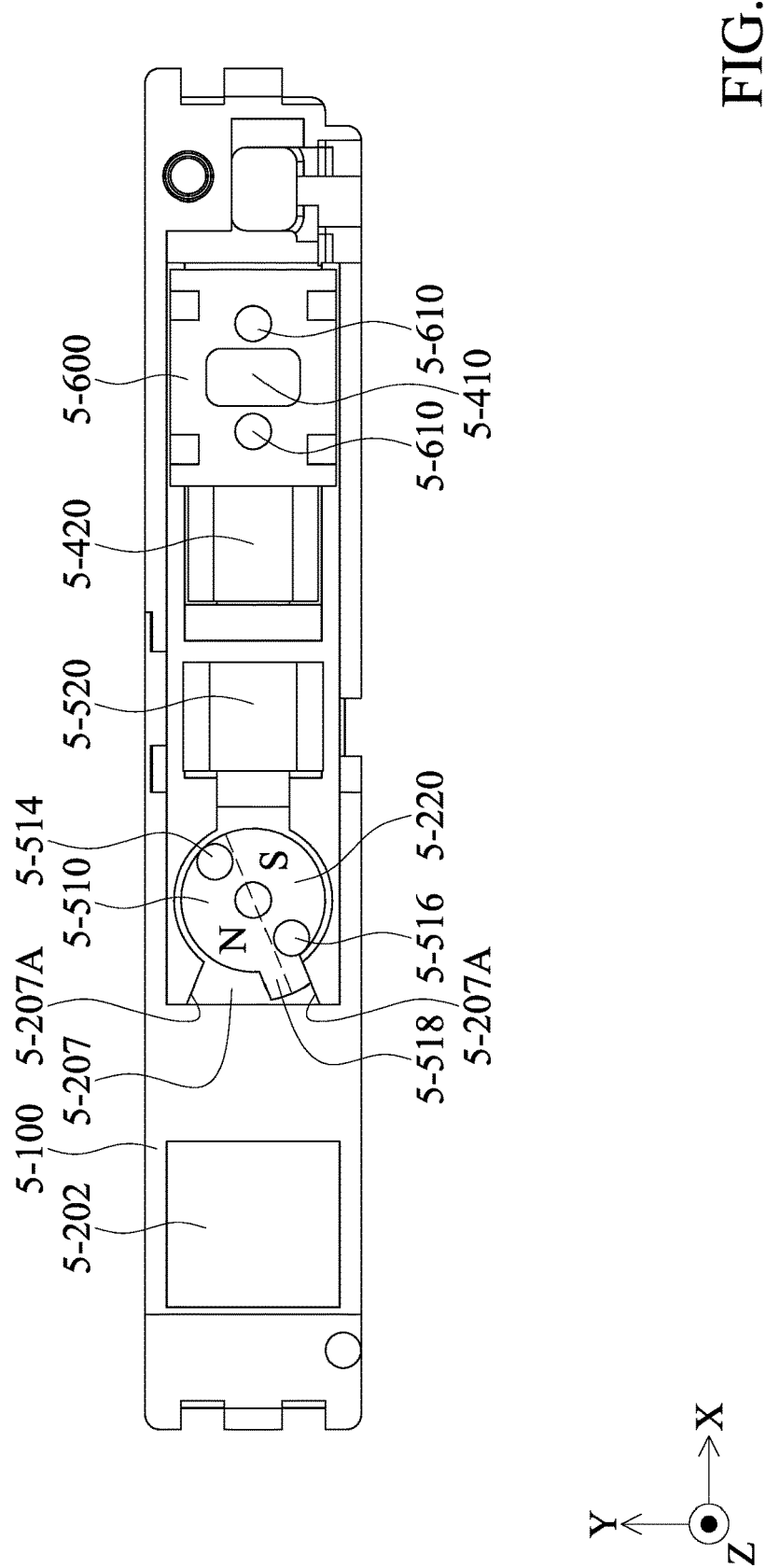
FIG. 10 and FIG. 11 are schematic views of the positioning element during operation.
Figure 11:
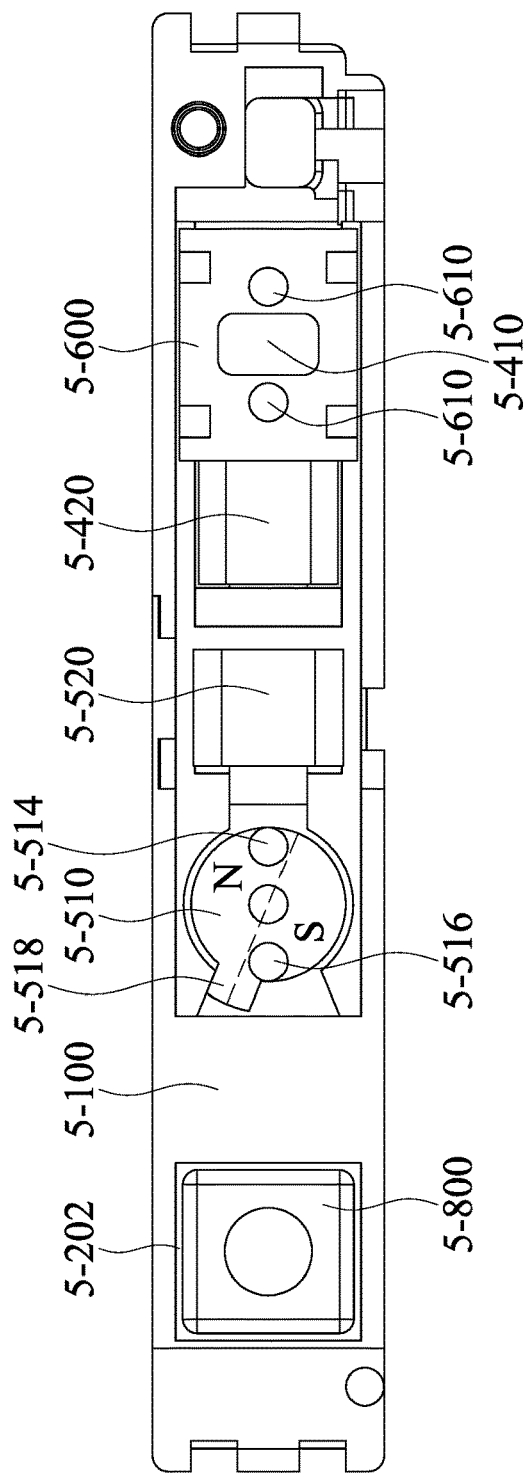

FIG. 10 and FIG. 11 are schematic views of the positioning element 5-510 during operation. The second magnetic element 5-420 and the third magnetic element 5-430 may be disposed in the recess 5-205 of the base 5-200 (FIG. 5), the fourth element 5-520 and the fifth magnetic element 5-530 may be disposed in the recess 5-206 of the base 5-200, and the positioning element 5-510 may be disposed in the recess 5-207 of the base 5-200. Furthermore, the third magnetic element 5-430 may be disposed in the second magnetic element 5-420 and partially exposed from the second magnetic element 5-420, and the fifth magnetic element 5-530 may be disposed in the fourth magnetic element 5-520 and partially exposed from the fourth magnetic element 5-520.

As shown in FIG. 10 and FIG. 11, the positioning element 5-510 may rotate in the recess 5-207 using the column 5-220 that passes through the hole 5-512 as a rotational axis, until the stopping portion 5-518 comes into contact with the side 5-207A of the recess 5-207. It should be noted that the limiting portions 5-514 and 5-516 are not arranged in the X direction in FIG. 10, and the limiting portions 5-514 and 5-516 are substantially arranged in the X direction in FIG. 11.

It should be noted that the positioning element 5-510 may be a magnet, and the magnetic pole directions may be shown in FIG. 10 and FIG. 11. In some embodiments, the magnetic pole directions of the positioning element 5-510 may be exchanged, and is not limited thereto. In some embodiments, the fourth magnetic element 5-520 may be a coil, and the fifth magnetic element 5-530 may be magnetic permeable material disposed in the coil. In other words, the fourth magnetic element 5-520 and the fifth magnetic element 5-530 may act as an electromagnet. When current with different directions is pass to the fourth magnetic element 5-520, the fourth magnetic element 5-520 will interact with the magnetic field of the positioning element 5-510 to generate an electromagnetic force to rotate the positioning element 5-510 in different directions for controlling the position of the positioning element 5-510. Furthermore, the second driving assembly 5-500 and the first driving assembly 5-400 may be separated for a distance to prevent magnetic interference from occurring.

In some embodiments, the first driving assembly 5-400, the second driving assembly 5-500 and the positioning element 5-510 are arranged in the first direction (the X direction) to reduce the size on other directions and to control the direction of magnetic force. Furthermore, the limiting element 5-700 (FIG. 2) may be used to limit the movable range of the elements (such as the positioning element 5-510) in the optical element driving mechanism 5-1 in the Z direction to prevent the elements in the optical element driving mechanism 5-1 from falling out. For example, the limiting element 5-700 may be disposed between the case 5-100 and the positioning element 5-510, which means the limiting element 5-700 may be disposed between the positioning element 5-510 and the fixed portion 5-F.

Figure 12:
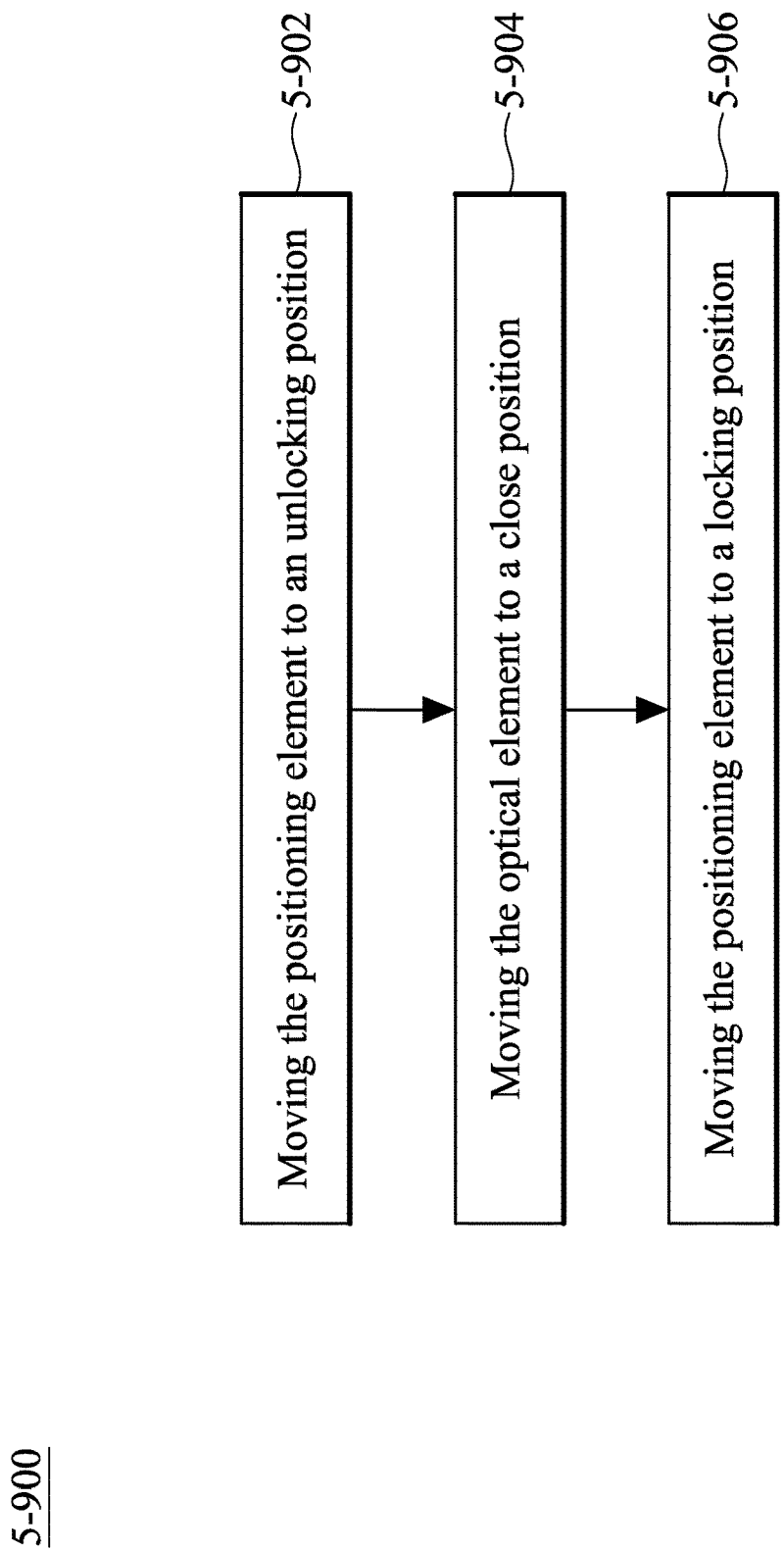
FIG. 12 and FIG. 13 are block diagrams of methods for operating the optical element driving mechanism.
Figure 13:
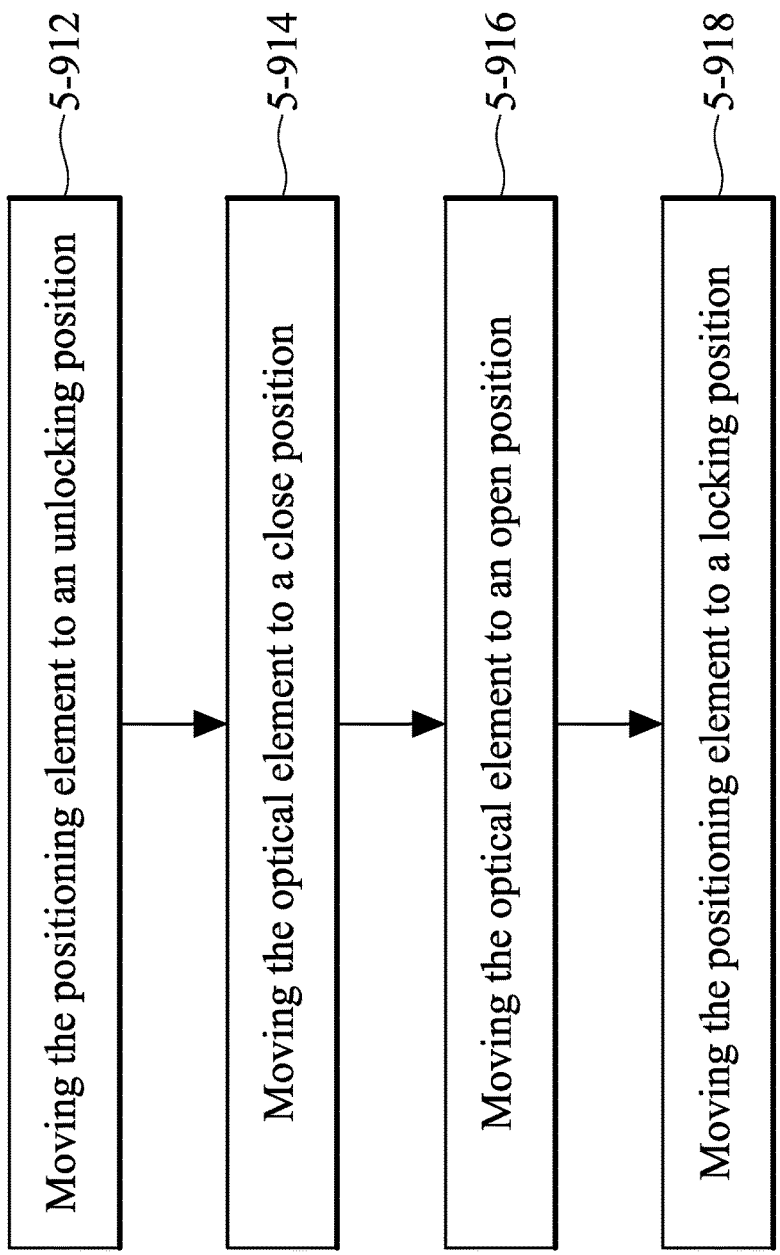
Figure 14:
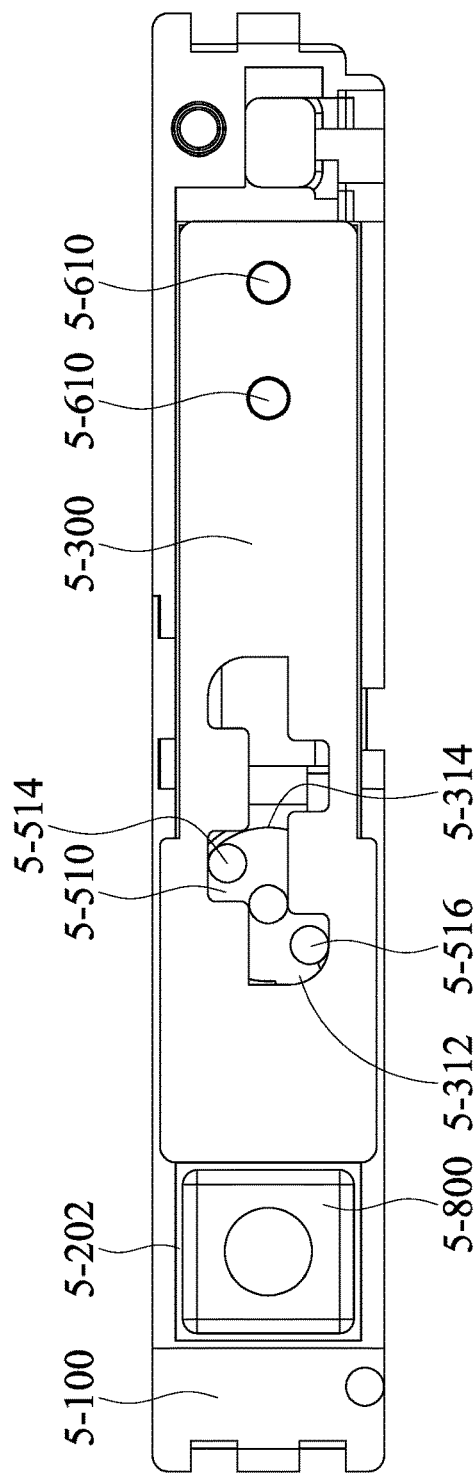
FIG. 14 to FIG. 19 are schematic views of the optical element driving mechanism during operation.

FIG. 12 and FIG. 13 are block diagrams of methods 5-900, 5-910 for operating the optical element driving mechanism 5-1, and FIG. 14 to FIG. 19 are schematic views of the optical element driving mechanism 5-1 during operation.

Figure 15:
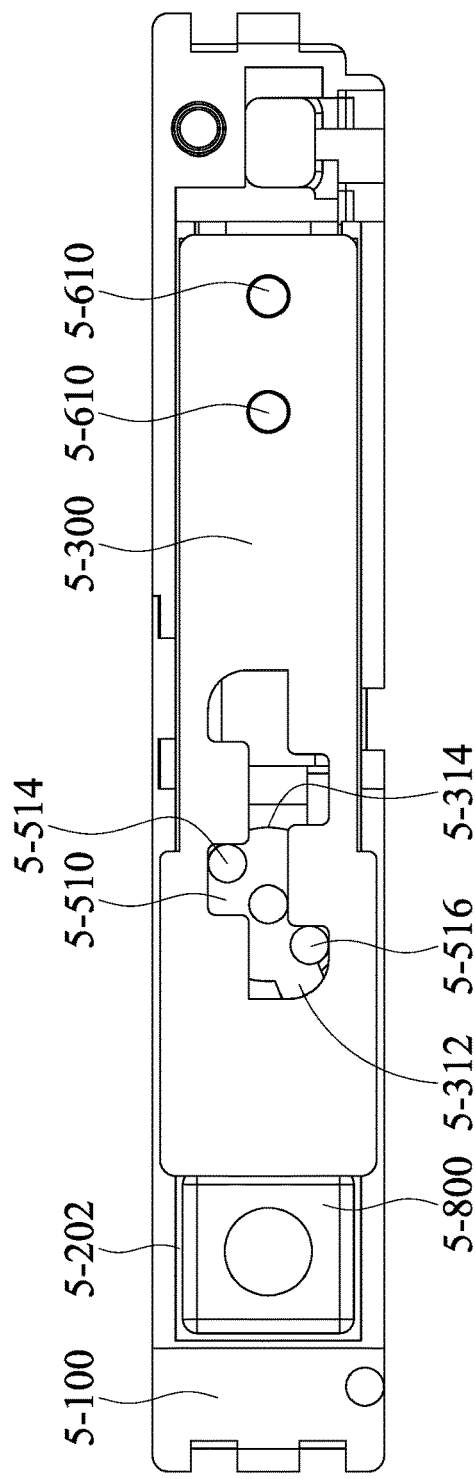

When the optical element driving mechanism 5-1 is not operating, the limiting portions 5-514 and 5-516 of the positioning element 5-510 may pass through the optical element 5-300 and in the notches 5-314 and 5-312, respectively. In other words, the positing element 5-510 is in a locking position, and the optical element 5-300 cannot move freely on the contact portions 5-230 (FIG. 5) of the base 5-200. For example, as shown in FIG. 15, when the optical element 5-300 is moved to the left by an external force, the limiting portions 5-514 and 5-516 may come into contact with the sides of the notches 5-314 and 5-312, respectively, to limit the movable range of the optical element 5-300. As a result, the optical element 5-300 may be prevented from blocking the opening 5-202 and the optical module 5-800 will allow light to pass through the opening 5-202 to the optical module 5-800. In some embodiments, if the optical element 5-300 is moved to right, the stopping portion 5-330 of the optical element 5-300 may in contact with the protruding portion 5-209 (not shown) of the base 5-200 to limit the position of the optical element 5-300.

Figure 16:
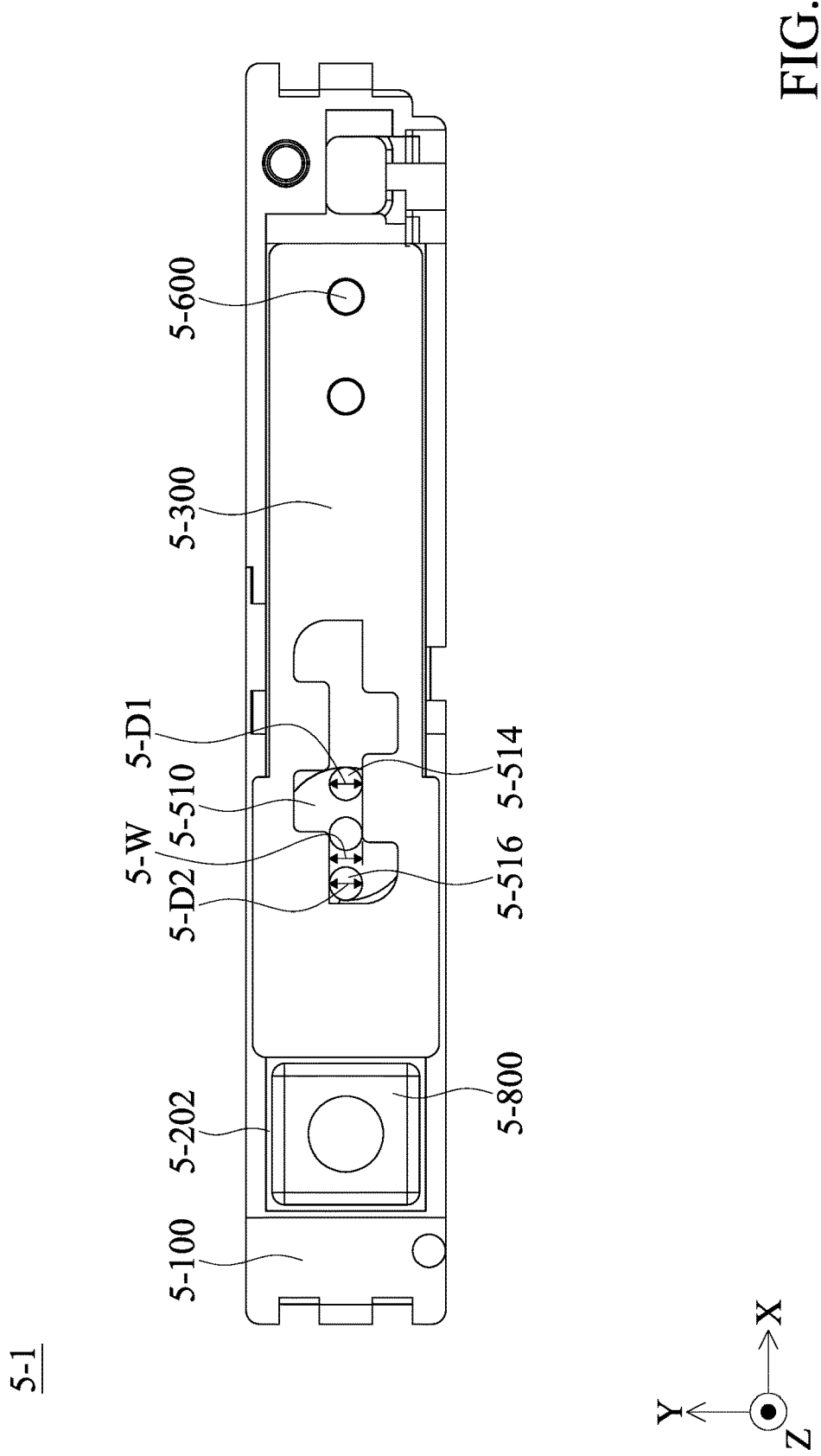

The operation method 5-900 of the optical element driving mechanism 5-1 includes an operation 5-902 for moving the positioning element 5-510 to an unlocking position, which corresponds to FIG. 16. In FIG. 16, the positioning element 5-510 rotates to allow the limiting portions 5-514 and 5-516 to be substantially arranged in the X direction, i.e. parallel to the extension direction of the passage 5-311. The width 5-W of the passage 5-311 may be designed to be greater than the diameter 5-D1 of the limiting portion 5-514 and the diameter 5-D2 of the limiting portion 5-516 to allow the limiting portion 5-514 and the limiting portion 5-516 to pass through the passage 5-311. It should be noted that the optical module 5-800 is still exposed from the opening 5-202.

It should be noted that the holder 5-600 may be fixed by the positioning element 5-610 and the optical element 5-300, the first magnetic element 5-410 may be disposed in the recess 5-620 of the holder 5-600, exposed from the opening 5-622, and arranged with the second magnetic element 5-420 in the second direction (the Z direction), and the holder 5-600 may be disposed between the optical element 5-300 and the first driving assembly 5-400. As a result, the optical element 5-300 may be moved with the first magnetic element 5-410. For example, the first magnetic element 5-410 may include magnet, and the second magnetic element 5-420 and the third magnetic element 5-430 may be a coil and magnetic permeable material disposed in the coil. In other words, the second magnetic element 5-420 and the third magnetic element 5-430 may act as an electromagnet. As a result, current having different directions may be provided to the second magnetic element 5-420 to control the position of the first magnetic element 5-410 and the optical element 5-300.

Figure 17:
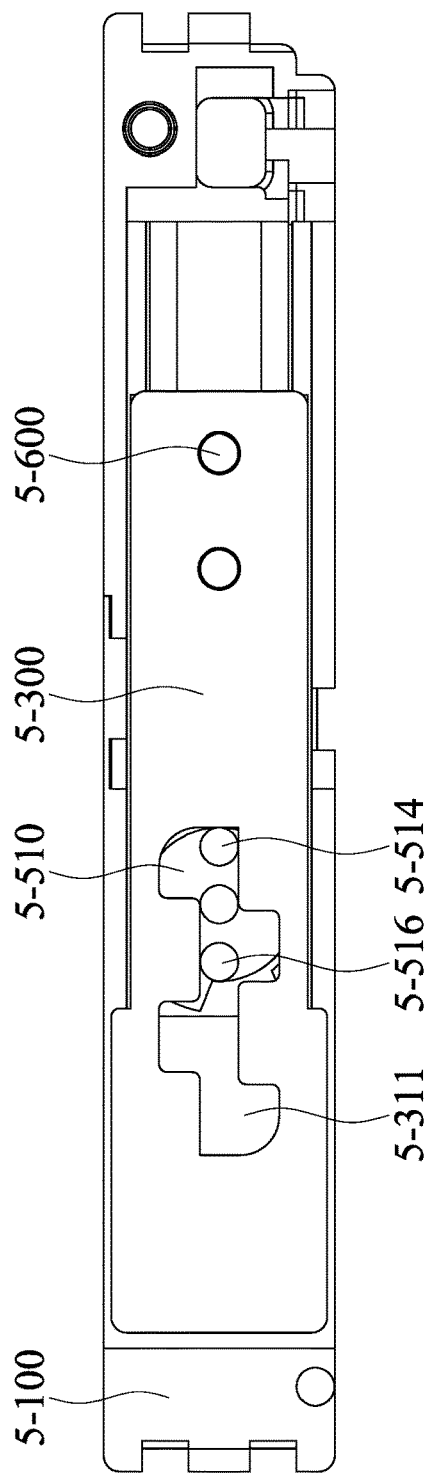

Afterwards, the operation method 5-900 continues to an operation 5-904 for moving the optical element 5-300 to a closed position, corresponding to FIG. 17. In FIG. 17, the optical element 5-300 moves to the left to allow the opening 5-202 and the optical module 5-800 disposed in the opening 5-202 to be covered by the optical element 5-300.

Figure 18:
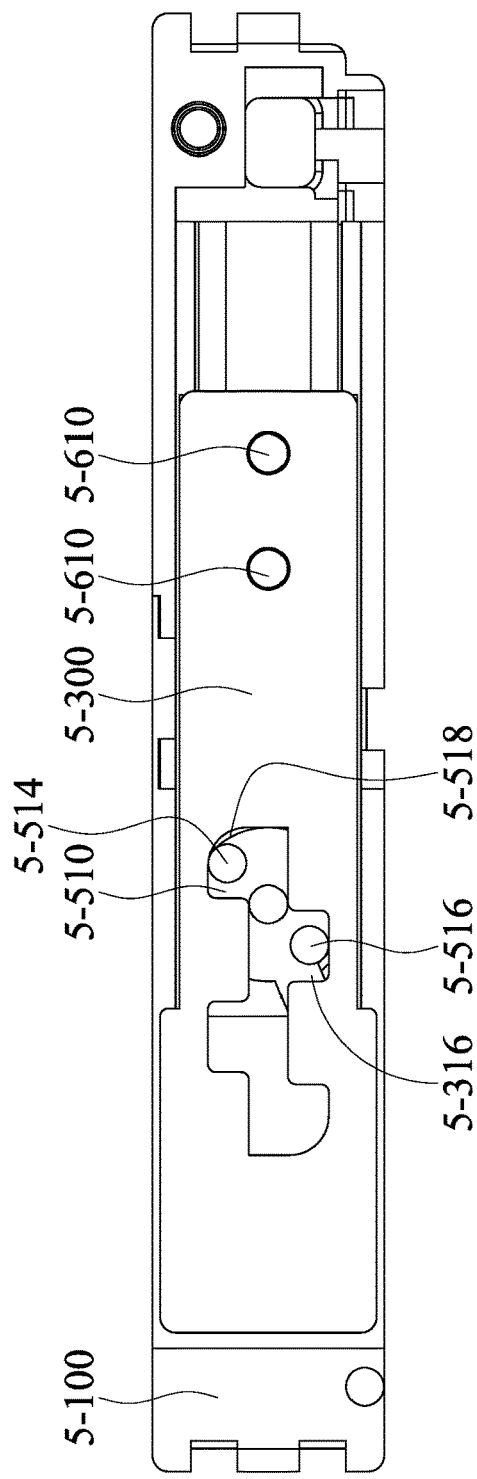
Figure 19:
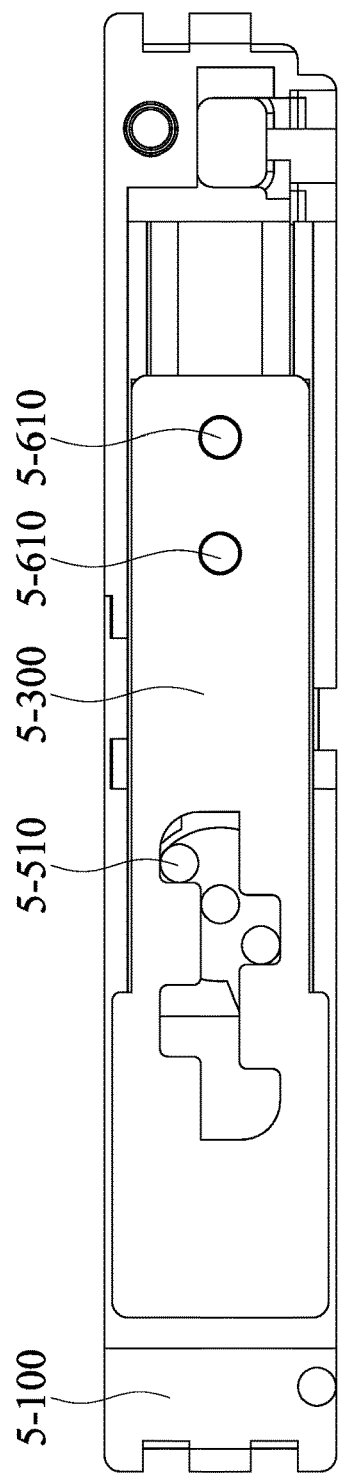

Afterwards, the operation method 5-900 continues to an operation 5-906 for moving the positioning element 5-510 to a locking position, corresponding to FIG. 18. In FIG. 18, the stopping portions 5-514 and 5-516 of the positioning element 5-510 may be positioned in the notches 5-318 and 5-316, respectively, to limit the movement of the optical element 5-300. In other words, the positioning element 5-510 is at a locking position, and the optical element 5-300 cannot move freely on the contact portion 5-230 (FIG. 5) of the base 5-200. For example, as shown in FIG. 19, when the optical element moves to the left by an external force, the limiting portions 5-514 and 5-516 may in contact with the sides of the notches 5-318 and 5-316 to limit the movable range of the optical element 5-300. As a result, the optical module 5-800 may be prevented from being exposed from the opening 5-202 to increase security when the optical module is not in use.

The present disclosure also provides an operating method 5-910 of the optical element driving mechanism 5-1. The operating method 5-910 includes an operation 5-912 for moving the positioning element 5-510 to an unlocking position, which corresponds to FIG. 16. Afterwards, the operation method 5-910 continues to an operation 5-914 for moving the optical element 5-300 to a closed position, corresponding to FIG. 17. The details are similar to those of operations 5-902 and 5-904, and are not repeated.

Afterwards, the operation method 5-910 continues to an operation 5-916 for moving the optical element 5-300 to an open position, corresponding to FIG. 16, and an operation 5-918 for moving the positioning element 5-510 to a locking position, corresponding to FIG. 15. In other words, during the operating method 5-910, the optical element 5-300 does not continuously cover the opening 5-202 and the optical module 5-800, and is turned back to the condition in FIG. 15 where the optical module 5-800 is exposed from the optical element 5-300. As a result, the optical element 5-300 may act as a shutter of the optical module 5-800, which means that it only covers the optical module 5-800 for a specific amount of time. Furthermore, when the optical element 5-300 is not in use, moving the positioning element 5-510 to the locking position may prevent the optical element 5-300 being moved by external forces.

In summary, an optical element driving mechanism is provided. The optical element driving mechanism includes a fixed portion, a movable portion, a first driving assembly, and a positioning element. The movable portion is movably disposed on the fixed portion and comprising an optical element, wherein the optical element moves in a first direction. The first driving assembly is at least partially disposed on the fixed portion. The positioning element is rotatably disposed on the fixed portion or the movable portion, wherein when the first driving assembly is not activated, the positioning element is used to limit the position of the movable portion relative to the fixed portion to a limit position. As a result, the optical module may be prevented from being exposed from the opening to increase the security of the optical module when the optical module is not in use, or the optical element driving mechanism may act as a shutter of the optical module.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical element driving mechanism, comprising:
    a fixed portion;
    a movable portion movably disposed on the fixed portion and comprising an optical element, wherein the optical element moves in a first direction;
    a first driving assembly at least partially disposed on the fixed portion;
    a holder affixed to the optical element and disposed between the optical element and the first driving assembly; and
    a positioning element rotatably disposed on the fixed portion or the movable portion, wherein when the first driving assembly is not activated, the positioning element is used to limit a position of the movable portion relative to the fixed portion to a limit position, and the positioning element comprises a main body and a limiting portion extending from the main body in a second direction that is perpendicular to the first direction, wherein the limiting portion passes through the optical element.

2. The optical element driving mechanism as claimed in claim 1, further comprising a second driving assembly separated from the first driving assembly for a distance.

3. The optical element driving mechanism as claimed in claim 2, wherein the first driving assembly, the second driving assembly, and the positioning element are arranged in the first direction.

4. The optical element driving mechanism as claimed in claim 1, wherein the first driving assembly comprises a first magnetic element and a second magnetic element arranged in the second direction that is perpendicular to the first direction.

5. The optical element driving mechanism as claimed in claim 1, wherein the fixed portion comprises a case and a base, the case is disposed on the base, and the case comprises a connecting portion directly connected to the base.

6. The optical element driving mechanism as claimed in claim 1, wherein the positioning element further comprises a stopping portion extending from the main body.

7. The optical element driving mechanism as claimed in claim 1, further comprising a limiting element disposed between the positioning element and the fixed portion.

8. The optical element driving mechanism as claimed in claim 7, wherein the fixed portion comprises a case and a base, the case is disposed on the base, and the limiting element is disposed between the case and the positioning element.

9. The optical element driving mechanism as claimed in claim 1, further comprising an electronic element disposed on the fixed portion, and the first driving assembly is disposed between the electronic element and the positioning element.

10. The optical element driving mechanism as claimed in claim 1, wherein the fixed portion has an opening for accommodating an optical module.

11. The optical element driving mechanism as claimed in claim 10, wherein the opening at least partially overlaps the optical module in the second direction that is perpendicular to the first direction.

12. The optical element driving mechanism as claimed in claim 1, further comprising a circuit electrically connected to the first driving assembly, wherein the fixed portion has a recess, and the circuit is disposed in the recess.

13. The optical element driving mechanism as claimed in claim 12, wherein the first driving assembly is positioned between the recess and the positioning element.

14. The optical element driving mechanism as claimed in claim 1, wherein the first driving assembly comprises a first magnetic element, the holder has a recess, and the first magnetic element is disposed in the recess.

15. The optical element driving mechanism as claimed in claim 14, wherein the holder has an opening, and the first magnetic element is exposed from the opening when viewed in the second direction that is perpendicular to the first direction.

16. The optical element driving mechanism as claimed in claim 1, wherein the optical element has a passage, each of the limiting portions has a column-like shape, and a width of the passage is greater than a diameter of each of the limiting portions.

17. An optical element driving mechanism, comprising:
    a fixed portion comprising a case and a base, wherein the case is disposed on the base, and the case comprises a connecting portion directly connected to the base;
    a movable portion movably disposed on the fixed portion and comprising an optical element, wherein the optical element moves in a first direction;
    a first driving assembly at least partially disposed on the fixed portion; and
    a positioning element rotatably disposed on the fixed portion or the movable portion, wherein when the first driving assembly is not activated, the positioning element is used to limit a position of the movable portion relative to the fixed portion to a limit position, and the positioning element comprises a main body and a limiting portion extending from the main body in a second direction that is perpendicular to the first direction, wherein the limiting portion passes through the optical element,
    wherein the connecting portion is positioned between the first driving assembly and the positioning element when viewed in a third direction that is perpendicular to the first direction.

18. An optical element driving mechanism, comprising:
    a fixed portion comprising a case and a base, wherein the case is disposed on the base, and the case comprises a connecting portion directly connected to the base;
    a movable portion movably disposed on the fixed portion and comprising an optical element, wherein the optical element moves in a first direction;
    a first driving assembly at least partially disposed on the fixed portion;
    a positioning element rotatably disposed on the fixed portion or the movable portion, wherein when the first driving assembly is not activated, the positioning element is used to limit a position of the movable portion relative to the fixed portion to a limit position, and the positioning element comprises a main body and a limiting portion extending from the main body in a second direction that is perpendicular to the first direction, wherein the limiting portion passes through the optical element; and
    a second driving assembly, wherein the second driving assembly and the connecting portion at least partially overlap each other when viewed in a third direction that is perpendicular to the first direction.

* * * * *